United States Patent Office 3,808,132
Patented Apr. 30, 1974

3,808,132
GREASE THICKENED WITH CHLORINATED AROMATIC POLYMER
Alan M. Dobry, Chicago, Ill., and Kemp R. Bunting, Munster, Ind., assignors to Standard Oil Company, Chicago, Ill.
No Drawing. Filed Sept. 20, 1971, Ser. No. 182,169
Int. Cl. C10m 5/18, 7/28
U.S. Cl. 252—54                      4 Claims

ABSTRACT OF THE DISCLOSURE

Hexane-insoluble polychlorinated aromatic polymeric material, which is obtained by refluxing a sulfuryl chloride solution of 1,4-bis-trichloromethyl benzene, sulfur monochloride, and anhydrous aluminum chloride, is used to thicken lubricating fluids to grease consistency.

---

The invention herein described was made in the course of or under a contract with the Department of the Air Force.

FIELD OF THE INVENTION

This invention relates to lubricating grease compositions in which the thickening agent is a polymeric material.

SUMMARY OF THE INVENTION

The lubricant grease composition of the present invention comprises a lubricating fluid and a thermally stable hexane-insoluble polychlorinated aromatic polymeric material formed by refluxing a sulfuryl chloride solution of 1,4-bistrichloromethyl benzene, sulfur monochloride, and anhydrous aluminum chloride for a period of at least 9 hours.

The present invention is based on the discovery that the hereindescribed finely-divided solid polymeric material, which is chemically unreactive with and insoluble in the lubricating fluid, can be dispersed in the lubricating fluid to form a homogeneous fluid/thickener system that is suitable for use as a lubricant grease.

The perchlorination of 1,4-bistrichloromethyl benzene in the manner described by Ballester et al., J.A.C.S. 82, 4254–4258 (1960), yields a mixture of solids. Briefly, the perchlorination comprises refluxing a sulfuryl chloride solution of 1,4-bistrichloromethyl benzene, sulfur monochloride, and anhydrous aluminum chloride for several hours and then recovering the solids. It has been found that when the refluxing step is extended for a greater time or when high purity reactants are used in a 9 hour reflux period, a thermally stable hexane-insoluble polychlorinated aromatic polymeric material is formed. The polymeric material is insoluble in boiling hexane, boiling chloroform, boiling ethylene dichloride, carbon disulfide or hot trifluoroacetic acid. It does not react with concentrated hydrochloric acid. No melting or softening of the material was noted when heated to 300° C.

The polymeric thickener material used in the present invention is formed (following the procedure set forth in the aforesaid Ballester et al. paper which is incorporated by reference herein) by refluxing a sulfuryl chloride solution of (a) 1,4-bistrichloromethyl benzene, (b) sulfur monochloride, and (c) anhydrous aluminum chloride for a period of at least 9 hours; said solution containing, per 100 parts by weight of (a), from about 25 to about 100 parts by weight of (b) and from about 10 to about 100 parts by weight of (c). The solids remaining after removal of the sulfuryl chloride solvent/reactant are then treated with boiling hexane to extract the hexane-soluble materials and the hexane-insoluble material is recovered from hexane solvent.

The polymeric thickener is used in an amount sufficient to thicken the lubricating fluid and form the grease having the desired consistency or penetration. The amount is generally between about 5 and about 50 weight percent, usually between about 8 and about 30 weight percent, of the total composition.

The lubricating fluid component of the greases of this invention can be any normally liquid lubricating oil or fluid of natural or synthetic origin that is normally used in lubricant grease compositions. Illustrative of such oils are the conventional mineral lubricating oils and synthetic lubricating fluids or oils, such as silicone oils, fluorosilicone oils, polyether fluids, polyester fluids, polyfluoro fluids, etc., having viscosities within lubricating oil viscosity range.

The lubricant grease compositions of the present invention can contain, if desired, lubricant additives well known to the art without departing from the scope of the invention. For example, such greases can contain corrosion and/or rust inhibitors, E.P. agents, anti-oxidants, metal deactivators, stabilizers, anti-wear agents, and the like. The use of such additives and the amounts thereof depend upon the severity of the conditions to which the grease may be subjected.

The polymeric thickeners of this invention are finely-divided thermally stable solid materials which are inert and insoluble in the lubricating fluid. The term "thermally stable" means that the thickener does not melt or soften at grease operating temperatures.

The grease compositions are prepared by simply dispersing the solid polymeric thickener, in finely-divided particulate form, such as a powder, in the fluid and then milling the dispersion mixture to the desired grease consistency. Any method of mixing that imparts shearing action may be used. Preferably, the conventional grease roll mill is used to form a grease having a stable consistency or penetration. The particle size of the thickener is not critical, but the particles should be as small as possible, since it is well known that the stability of the grease is dependent upon the particle size of the solid thickener. Inasmuch as the polymeric thickener is inert and insoluble in the lubricating fluid, it is to be understood that a plurality of passes through a roll mill and adjustment of fluid content are required to obtain homogeneity of the solid thickener/fluid system and may effect a stable consistency in the grease.

The CRC L–35 bearing performance test was used to determine the performance of the exemplary grease formulations of this invention as bearing lubricants at elevated operating temperatures. At temperatures below 500° F., the size 204 test bearings were run in high speed test spindles at 10,000 r.p.m. in air, with a 5 pound radial load and a 5 pound axial load on the bearing, for 20 hours out of each 24 hour period until failure. In tests at or above 500° F., the test bearings, under a 50 pound radial load and a 25 pound axial load, were run continuously at the test temperature, until failure. All tests at atmospheric pressure.

DESCRIPTION OF THE PREFERRED EMBODIMENTS

Example 1

A mixture of 10.0 g. anhydrous aluminum chloride and 750 ml. freshly distilled sulfuryl chloride was brought to a gentle boil in a 2 liter flask equipped with a dropping funnel and a solvent stripper connected through an ice-cooled trap and a Drierite filled drying tube to the back of a fume hood. A solution of 20.0 g. sulfur monochloride and 40.0 g. 1,4-bis(trichloromethyl) benzene in 250 ml. freshly distilled sulfuryl chloride was added via the dropping funnel over a period of ½ hour to the boiling mixture. The heat was increased and sulfuryl chloride distilled off until the volume in the flask was reduced to about 500 ml.

The solvent stripper was replaced with a Friedrichs reflux condenser which was connected to the ice-cooled trap. The mixture was refluxed for 57 hours. Freshly distilled sulfuryl chloride was gradually added through the dropping funnel to keep the volume in the flask at 500 ml. and prevent the deposition of solids. The remaining sulfuryl chloride was removed by distillation at atmospheric pressure. The residue was stripped at room temperature and aspirator vacuum (ca. 15 torr), using a Dry Ice-cooled trap. The yellow crystalline solid remaining was mixed with 1 liter distilled water. Sodium bicarbonate was added until further additions yielded no further gas evolution. The mixture was heated on a steam bath for 2 hours and acidified to pH 2 with concentrated hydrochloric acid. Filtration yielded a pink solid.

The solid was boiled repeatedly with hexane and the hexane filtered off. The undissolved pink solid would not react with concentrated hydrochloric acid. On boiling with chloroform, the liquid turned pink and the solid became white. This white solid was insoluble in boiling ethylene dichloride or boiling chloroform, carbon disulfide or hot trifluoroacetic acid. It amounted to 2.56 g. which would not melt below 300° C.

Attempts were made to analyze this solid for chlorine content. Sodium fusion gave incomplete reaction and a chlorine content of 21 percent was measured. Bomb chlorine analysis also resulted in incomplete reaction and a measured chlorine content of 27.3 percent. This solid is very resistant to chemical attack and can only be characterized as a polychlorinated aromatic polymeric material of indeterminate chemical composition.

The hexane-insoluble material was dispersed in a perfluorinated polyether lubricating fluid, derived from hexafluoropropylene oxide, "Krytox" 143AC, at room temperature. Milling of the dispersion on a three-roll mill formed a grease containing 15.1 percent thickener and an ASTM D-1403 quarter-cone penetration of 296. Two test bearings containing this grease ran for 83 and 119 hours at 550° F.

Example 2

The chlorination reaction of Example 1 was repeated using same amounts of freshly purified reactants. After 9 hours reflux time, 2.32 g. of hexane-insoluble polymeric material was recovered which did not melt or soften at temperatures up to 460° C.

A grease made with the "Krytox" 143AC fluid contained 16.2 percent of this material and had a quarter-cone penetration of 300. The test bearing, lubricated with the grease of this example, was still functional after 77 hours at 550° F. when the test had to be discontinued because of mechanical failure in the tester assembly.

The "Krytox" 143AC is a commercially available lubricating fluid and is well known in the art.

We claim:

1. The grease composition comprising a lubricating fluid and an amount, sufficient to thicken the fluid to grease consistency, of the hexane-insoluble reaction product of the process comprising reacting a sulfuryl chloride solution of (a) 1,4-bistrichloromethylbenzene, (b) sulfur monochloride, and (c) anhydrous aluminum chloride under reflux conditions for a period of at least 9 hours; said solution containing, per 100 parts by weight (a), from about 25 to about 100 parts by weight of (b) and from about 10 to about 100 parts by weight of (c); and recovering said hexane-insoluble reaction product from the reaction mixture.

2. The composition of claim 1 wherein the amount of said reaction product is from about 5 to 50 weight percent.

3. The composition of claim 1 wherein the amount of (b) is about 50 parts by weight and the amount of (c) is about 25 parts by weight.

4. The composition of claim 3 wherein the lubricating fluid is a perfluoropolyether.

References Cited

UNITED STATES PATENTS 3,536,624  10/1970  Christian et al. _____ 252—58
2,915,471  12/1959  Lorensen _____ 252—54

DANIEL E. WYMAN, Primary Examiner

I. VAUGHN, Assistant Examiner

U.S. Cl. X.R.

208—102